United States Patent
Nothmann et al.

[15] 3,689,150
[45] Sept. 5, 1972

[54] AUTOMATIC ROLL FILM CAMERA

[72] Inventors: Gerhard A. Nothmann, Wilmette; Charles P. Sippel, Jr., Villa Park; Walter Scott Bartky, Chicago, all of Ill.

[73] Assignee: Robertson Photo-Mechanix, Inc., Des Plaines, Ill.

[22] Filed: Aug. 31, 1970

[21] Appl. No.: 68,183

[52] U.S. Cl. ................ 355/64, 95/31 FL, 95/14, 271/69, 271/79, 355/73, 355/76
[51] Int. Cl. ........................................... G03l 27/60
[58] Field of Search .....95/31 DS, 31 EL, 31 FM, 31, 95/14; 271/79, 69; 355/64, 76, 73; 93/93; 235/92 SB

[56] References Cited

UNITED STATES PATENTS

| | | | |
|---|---|---|---|
| 1,156,903 | 10/1915 | Henderson | 271/79 SR |
| 2,035,558 | 3/1936 | Lloyd | 95/31 DS |
| 2,247,104 | 6/1941 | Takacs | 95/31 DS |
| 2,508,965 | 5/1950 | Namenyi-Katz | 235/92 |
| 2,878,017 | 3/1959 | Blättner | 271/79 |
| 3,032,341 | 5/1962 | Reist | 271/79 |
| 3,068,749 | 12/1962 | Anander | 355/73 |
| 3,497,682 | 2/1970 | Haller et al. | 235/92 |
| 3,500,734 | 3/1970 | Lewis et al. | 95/14 |
| 3,503,677 | 3/1970 | Uchiyama | 95/31 EL |

*Primary Examiner*—Samuel S. Matthews
*Assistant Examiner*—E. M. Bero
*Attorney*—Hill, Sherman, Meroni, Gross & Simpson

[57] ABSTRACT

A process camera includes a plurality of mandrels for supporting separate rolls of normally different film in continuous web form and is automatically controlled to thread a selected film web through the rear case of the camera, restrict the area of film to be exposed to a selected length, introduce and remove selected contact screens when needed, expose the restricted area selectively, advance the film, measure the amount of film web advanced, cut the film web between exposed areas at a location downstream of an optical axis of the camera to form cut sheets of exposed film and convey the cut sheets to a subsequent processing station at a speed compatible with the speed of operation of the processing station. Once an operator has programmed the necessary variable control parameters into the camera control means, the camera components are operated throughout one camera cycle in a predetermined series of steps following the program sequence without requiring further attention by the operator.

17 Claims, 12 Drawing Figures

INVENTORS
Gerhard A. Nothmann
Charles P. Sippel, Jr.
Walter Scott Bartky
ATTORNEYS

AUTOMATIC ROLL FILM CAMERA

BACKGROUND OF THE INVENTION

1. Field of the Invention

The present invention generally relates to the graphic arts and more specifically relates to a roll film camera selectively utilizing plural continuous webs of photographic roll film and means for controlling operation of such a camera automatically.

2. Description of the Prior Art

A process camera for use in the graphic arts, printing, photo-fabrication and similar applications generally includes a track or bed having rails supporting a copyboard mechanism and a front lens case carried on the rails for relative translational movement toward and away from each other and from a fixed rear case for focusing. A bellows connects the front lens case to the rear case. A vacuum film holder or similar device for supporting film at the focal plane of the rear case is included in the rear case. Normally, the rear case of the camera may be disposed adjacent to a wall separating a dark room from a gallery, thereby to position the vacuum film holder in a dark room while the copyboard mechanism and lens case are located in the gallery.

Heretofore, process cameras have generally been of the cut sheet type and have required numerous and time consuming manual operations for positioning, and later removing the film sheets in the camera, for introducing contact screens for half tone exposures, and for sequencing and controlling the exposures themselves. Automatic cut sheet cameras are known, which simplify some of these operations, but, because of the problems associated with handling cut sheet film automatically, these have generally not been as reliable as desired and, moreover, have been costly to construct and maintain. Semi-automatic roll film cameras are also known, which exhibit a few of the advantages of the present invention. These cameras, however, have heretofore required operator attention and movement at numerous intervals during each of the production cycles and, furthermore, the construction of these cameras has been such as to limit access to the camera rear case from the darkroom, to require the lifting of heavy film rolls to an area above the head of the operator, and, generally, to provide a lower degree of automatic operation and usability than is contemplated by the present invention. Other cameras for handling film-like material automatically, in roll form, are also known. These have, heretofore, been limited to special sizes and types of such material and have exhibited similar disadvantages as have the semi-automatic roll film cameras referred to.

SUMMARY OF THE INVENTION

A process camera, constructed in accordance with the principles of the present invention, has a plurality of mandrels respectively supporting rolls of film, normally different in size, thickness or photographic characteristics. Various selectively operable drive means are controlled in response to signals received from a pre-settable sequential camera control means. All of the motions of film and of half-tone contact screens necessary to be performed on a dark room side of the camera are actuated by automatically controlled, mechanical means so that the operator does not have to enter the dark room and may attend to other functions in the gallery while a selected one of the film webs is positioned in the camera for an exposure. Also, once the selected film web is properly positioned in place for the exposure, the pre-settable camera control automatically controls the type and duration of the exposure of the film web. At the completion of the exposure, the camera control automatically positions the film web for the next exposure, thereby permitting the operator to utilize this time in the production cycle to change the piece of copy in the copyboard and to focus the camera.

An exemplary form of the present invention includes three rolls of film webs, normally different in width, respectively supported on separate mandrels disposed in a lower portion of a rear case of the camera and beneath a vacuum film holder or similar device forming a vertical backing surface for supporting the film in the camera film plane. The vacuum film holder is proportioned to support this web as well as, when necessary, a half-tone contact screen large enough to adequately cover the greatest width and greatest exposed length of such web. By positioning the film rolls in the lower portion of the camera rear case, the effort required to load and to unload the film rolls is minimized and the general flow of the film web through the camera may be in an upward direction, which provides advantages in simplicity of design of the film transport means and in accessibility of the rear case.

Three separate pairs of lower feed rollers are respectively disposed in proximity to the three film rolls and a leading edge of the film web on each of the film rolls is captured within a nip of the associated pair of feed rollers. In order to thread the selected film web into the camera, the camera control actuates selectively operable drive means controlling operation of the lower feed rollers associated with the selected film web to advance the leading edge into a position wherein the same may be captured by guiding means, specifically a vacuum head, for guiding the leading edge past the vacuum film holder and into a pair of upper feed rollers disposed above the vacuum film holder. During that threading operation the selected film web is unrolled by the lower feed rollers. Sensor means indicate when the film web has been properly threaded into the upper feed rollers, at which time the operation of the lower feed rollers is discontinued and the vacuum head is returned to a "-home" position in a lower portion of the rear case and below the vacuum film holder. The further advancement of the film is then under the control of the upper feed rollers.

The exposed length of the film web is determined by a pair of opaque curtains, which are mounted respectively above and below an optical axis of the camera for vertical movement toward and away from the optical axis in a manner to restrict the exposed length of the film. Each of the masking curtains has an edge guided for movement substantially parallel to the plane of the backing surface of the vacuum film holder. Selectively operable drive means move the curtains to the selected position for restricting the exposed area of the film to equal distances on either side of the optical axis.

Control signals transmitted by the camera control selectively operate the curtain drive means, and sensor means produce a feedback signal received by the control for indicating the position of the curtains so that the control may discontinue the operation of the curtain drive means when the curtains have arrived at the selected position.

After completion of a camera cycle, consisting of one or more exposures, the camera control produces a signal for controlling the operation of the upper feed rollers. Counting means operating with the upper feed rollers produce a feedback signal received by the camera control so that the camera control may discontinue further advancement of the film when the proper amount has been advanced. Generally, when a series of exposures are to be made on the same film web, that film web is advanced, after each exposure, by an amount substantially equal to one-half of the previous exposed length, plus one-half of the subsequent exposed length.

It is also contemplated by the present invention to transversely sever the exposed film web into individual sheets for further processing. Means for cutting the film are disposed downstream of the upper feed rollers at a predetermined distance along the film path beyond the optical axis of the camera. When the counting means operated by the upper feed rollers indicate that a leading edge of a previously exposed portion of the film is at the cutting location, the film advancement is automatically stopped by the camera control and a signal is produced for actuating the cutting means to sever the web. After completion of the cutting operation, the film advancement is continued until the proper portion of the film web is advanced into the exposure field for the subsequent exposure. The camera control retains, in a suitable memory device, the required information long enough to control those sequences of advancement and cutting.

Since certain small lengths of exposed film length are less than is conveniently handled in sheet form, provisions are made so that, whenever such short exposed lengths are used, the camera control automatically limits the length of cutoff sheets to a prescribed minimum and, furthermore, insures that cutoff does not occur within an exposed length of web.

The individual cut sheets of exposed film are discharged at an upper end of the camera rear case, and if desired, conveyor means may be provided for receiving the cut sheets and transporting the same to a subsequent processing station, such as an automatic film processor. One form of such conveyor means includes a three-part conveyor system characterized by a conveyor input belt receiving the cut sheets from the cutting means, a chain and gripper mechanism for transporting the cut sheet from the input belt and a delivery belt feeding the processor.

The chain and gripper mechanism moves the cut sheet to the delivery belt which is driven at an adjustable speed compatible with the speed of operation of the processor. In order to prevent the film sheets from overlapping in the processor, sensor means sense a trailing edge of the cut sheet on the delivery belt and produce a control signal which is directed to the camera control. In response to receiving that signal, the camera control prevents further movement of the chain and gripper mechanism as well as, if required, further advancement of film past the cutting means, until a point in the cycle is reached when another sheet can be conveyed to the delivery belt without overlapping the previous sheet.

One or more flexible half-tone screens are supported on vertical bars attached to appropriate, selectively and automatically operable drive means which, in preparation for a half-tone exposure, move a selected one of the screens from a screen cabinet into position to be rolled onto the vacuum film holder and over the film web. Subsequent to such movement, vacuum means automatically create intimate contact between the screen, the film web, and the vacuum film holder, to provide the necessary surface relation for appropriate uniform and effective half-tone exposure. After such exposure, vacuum is automatically removed and the screen is returned to the screen cabinet.

When it is desired to utilize film from another one of the three rolls, or to change to a cut sheet mode of operation, or to complete a camera production sequence, the control, which has stored the necessary information for controlling the sequence of operations, produces a signal to continue the advancement of the film through the upper feed rollers and the actuation of the cutting means until all previously exposed areas are severed from the web, at which time further advancement of the film web is halted. The camera control then transmits a signal to the drive means operating the vacuum head for moving the same into a position for receiving the film web from the upper feed rollers, and the lower feed rollers are operated in a direction to rewind the threaded film web on its roll. When a leading edge of the film web has been captured by the vacuum head, the vacuum head is lowered to guide the film downward past the vacuum film holder. Also, in order to maintain the film web in a taut condition on the rolls, friction drive means drive the rolls simultaneously with the operation of the lower feed rollers and in the rewinding direction. The vacuum head releases the film web, and the lower feed rollers stop at such time as the remaining portion of the web extending through the feed roller nip is still adequate to insure reliable gripping of this web but not so far as to interfere physically with the movement of other webs, from rolls, which will be threaded subsequently.

After the previously utilized film web has been rewound, if another one of the webs is to be utilized next, the vacuum head then moves to a position for grasping a leading edge of the other selected film web and that film web is threaded through the rear case in the manner described hereinabove.

A flash light source for directly illuminating the exposure field includes a flat panel of luminescent material, mounted on the side of the lens case facing the film web and is provided with an opening so as not to interfere with the normal camera light rays reflected from the copy, through the lens and shutter, and onto the film. The luminescent material emits illumination in response to an appropriate voltage signal, provided automatically by the camera control in the course of the exposure sequence, and such illumination is simultaneous with the normal camera light illumination so as to reduce the total exposure time.

DETAILED DESCRIPTION OF THE PREFERRED EMBODIMENT

Figure 1:
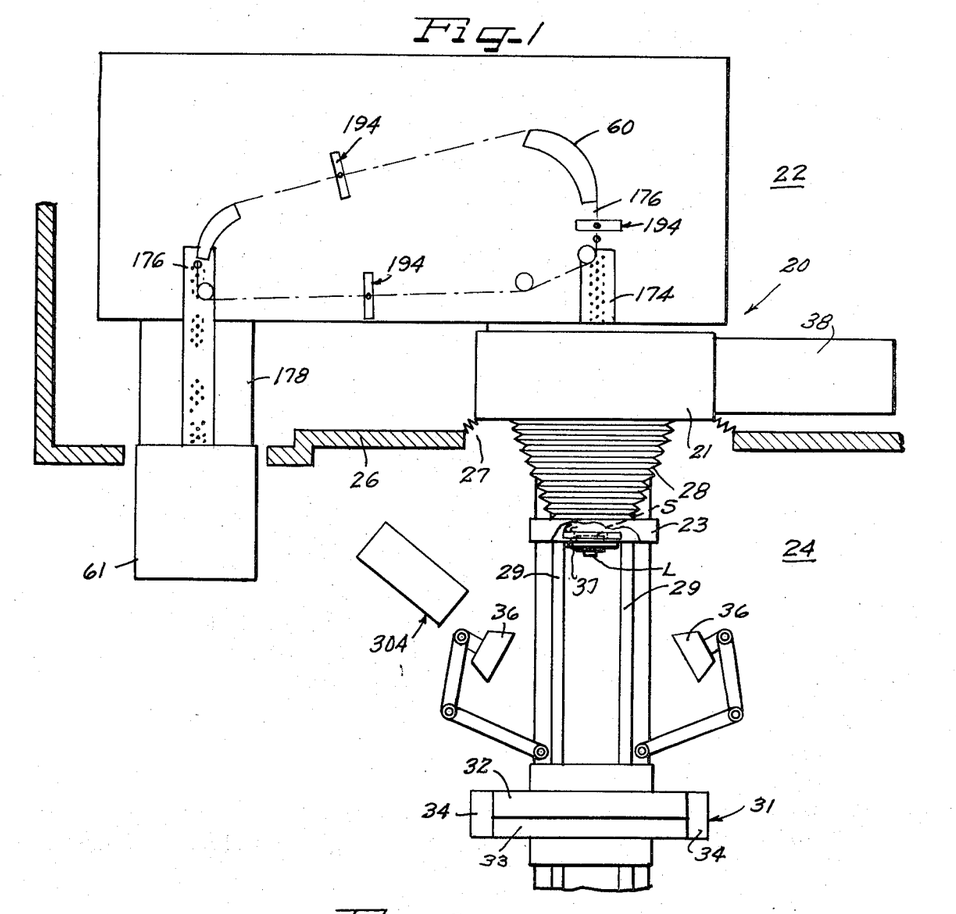
FIG. 1 is a top plan view of a process camera embodying the features of the present invention.

Referring to the drawings, and first particularly referring to FIG. 1, a process camera 20 constructed in accordance with the principles of the present invention, generally includes a rear case 21 disposed in a dark room 22 and a front case 23 disposed in a gallery 24. A wall or other partition 26 separates the dark room 22 from the gallery 24 and has an opening 27 adjacent to the rear case 21 through which bellows 28 pass for connecting, in a light-tight manner, the front case 23 to the rear case 21.

A pair of rails 29,29 support the front lens case 23 for translational movement toward and away from the copyboard mechanism 31 and from the rear case 21 in a manner to focus the camera 20. A lens "L" and a shutter mechanism "S" are housed in front case 23. The copyboard mechanism 31 is also supported on the rails 29,29 for translational movement and includes a pair of hinged sections 32 and 33, composing the copyboard itself, supported on side supports 34, 34 for tiltable movement about a horizontal axis and between a generally horizontal loading, unloading position and a generally, vertical exposure position. In operation, flat copy is manually loaded into, and subsequently removed from, the copyboard mechanism 31.

The camera construction also includes illumination means, such as the lights 36,36 for suitably illuminating the copyboard of the copyboard mechanism 31 during a main exposure or for providing a bump exposure to be described subsequently. The illumination also includes a light 37 disposed within the front lens case 23 for use during a flash exposure. It also includes a screen enclosure or cabinet 38, from which one of two halftone contact screens can be moved laterally across, and into intimate contact with, the film, for main and flash exposures.

Figure 2:
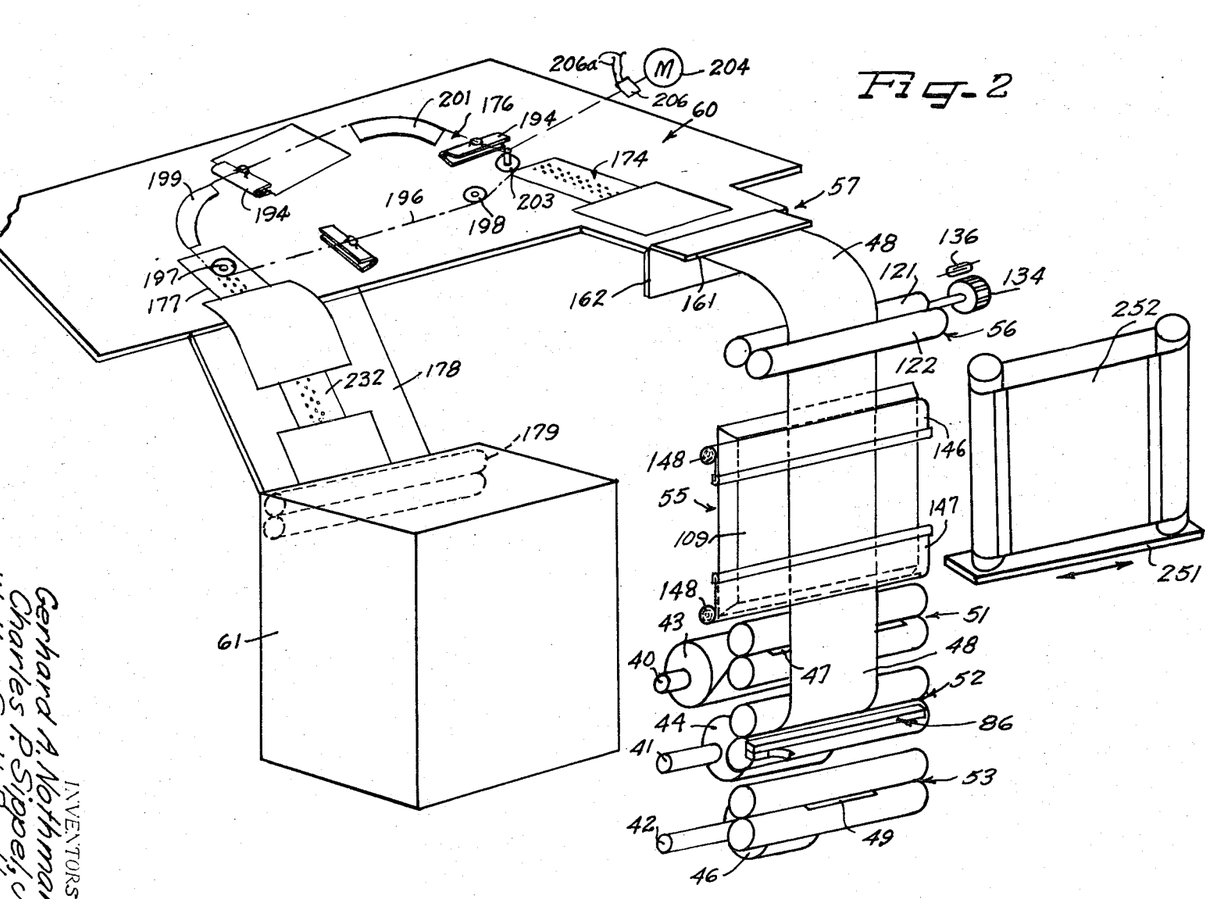
FIG. 2 is a diagrammatic, isometric view of the process camera illustrated in FIG. 1 with certain housing and other components removed to best illustrate the advancement of the film web through the camera.
Figures 4, 5:
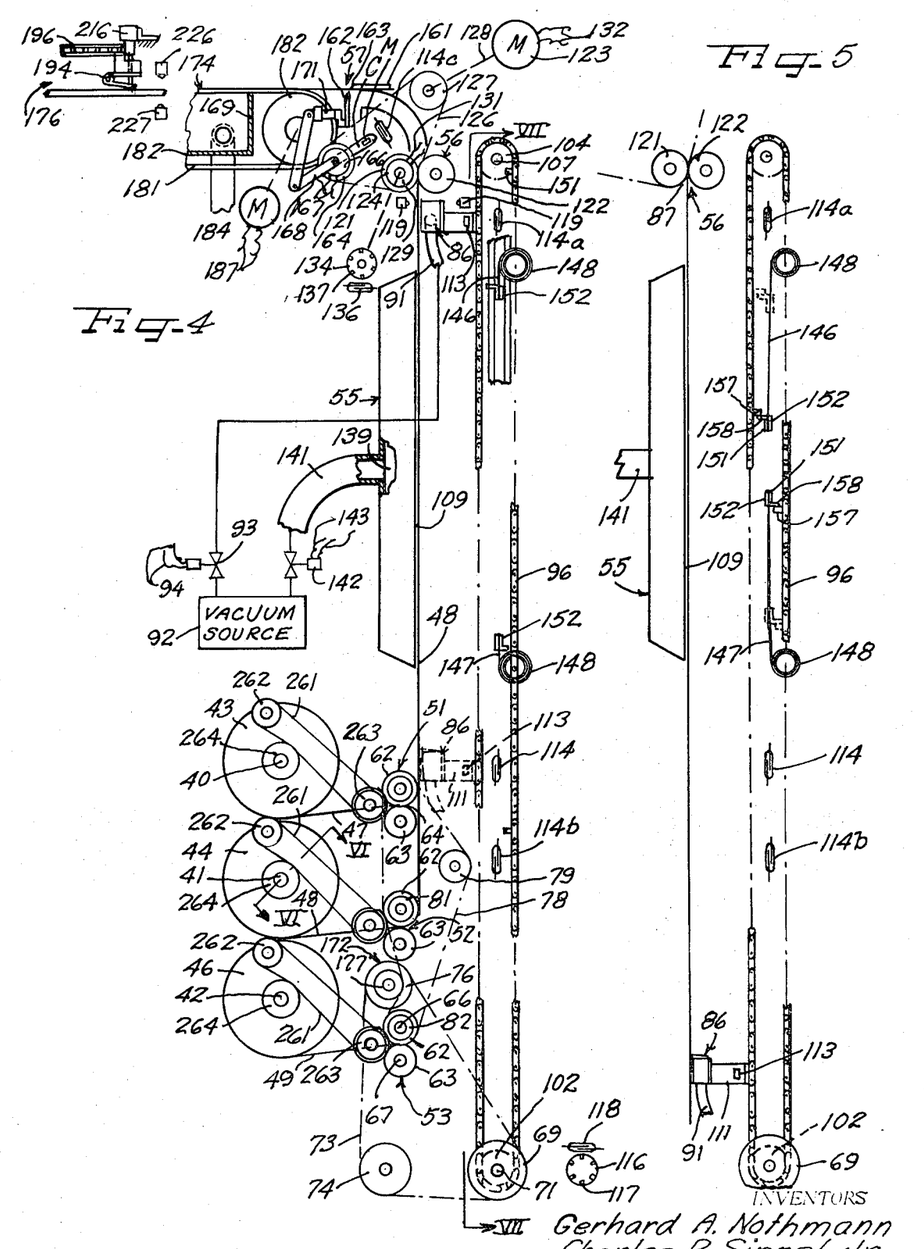
FIG. 4 is a side elevational view of the process camera of the present invention, with housing parts removed for clarity and with certain components shown diagtammatically.
FIG. 5 is a view similar to FIG. 4 and illustrates various positions of opaque masking curtains utilized for restricting the exposed length of the film web.
Figures 6, 7, 8:
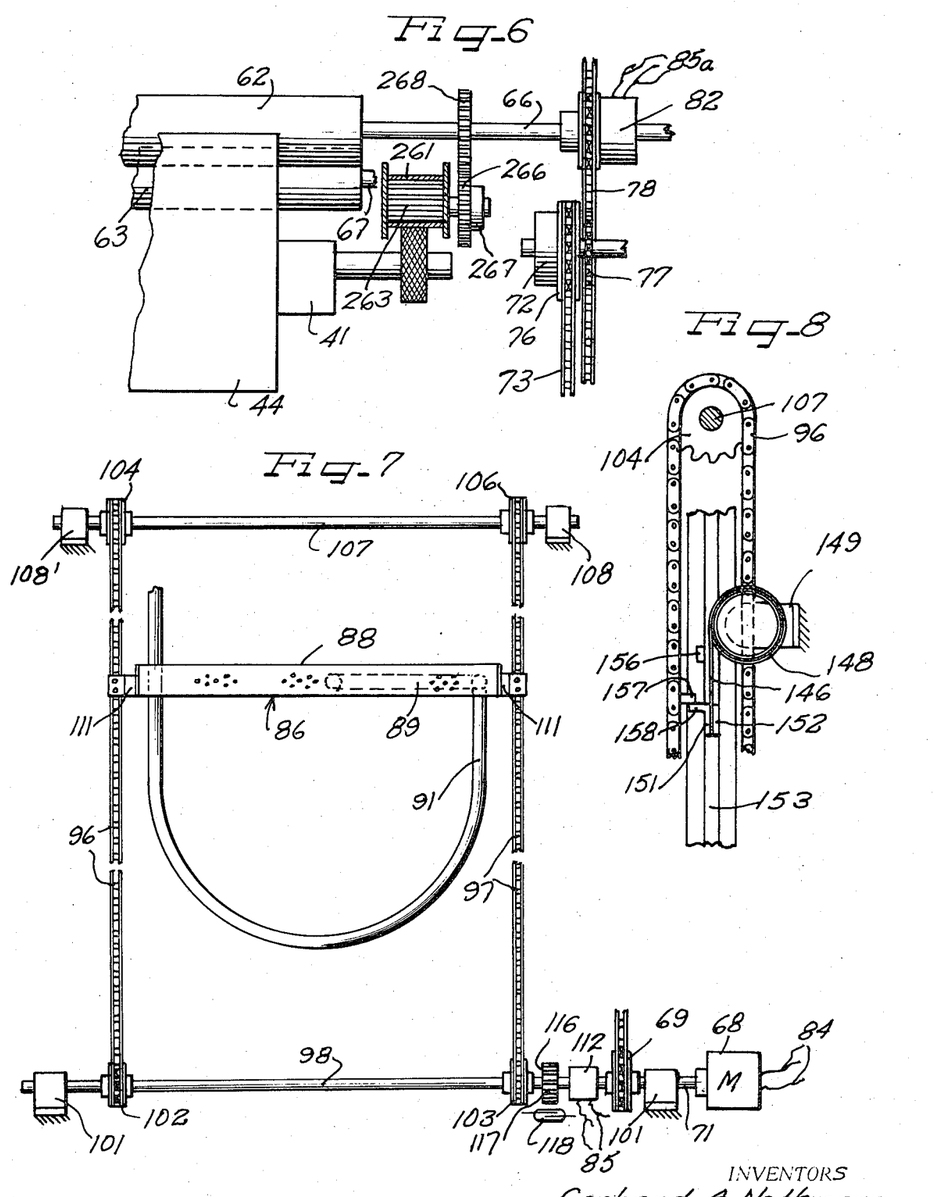
FIG. 6 is a sectional view taken substantially along line VI—VI of FIG. 4.
FIG. 7 is a view taken substantially along line VII—VII of FIG. 4 with certain parts removed for clarity.
FIG. 8 is an enlarged view illustrating one of the pair of masking curtains and the associated drive means.

In accordance with the principles of the present invention, the process camera 20 includes a plurality of mandrels, such as the three mandrels 40, 41 and 42, as illustrated in FIGS. 2, 4 and 6. The mandrels 40, 41 and 42 respectively support an equal number of rolls 43, 44 and 46 of photographic film 47, 48 and 49 in continuous web form usually differing from each other in width, thickness, or other properties. Once the rolls 43, 44 and 46 of film have been loaded manually into a lower portion of the camera rear case 21, a leading edge of each of the film webs 47, 48 and 49 is manually inserted in the nip of an associated pair of lower feed rollers 51, 52 and 53, thereby enabling the film webs subsequently to be automatically advanced or rewound in a controlled manner by the camera 20.

As illustrated in FIGS. 2 and 4, the general path of movement of a selected one of the film webs 47, 48 or 49, specifically 48 in these Figures, is in a generally upwardly direction past a vacuum film holder 55, through the pressure nip between a pair of upper feed rollers 56 and into a cutting device 57 disposed at an upper end of the rear case 21. The cutting device 57 transversely severs the film web between adjacent exposed areas or groups of exposed areas so that the film is discharged from the camera 20 in sheet form. The severed sheets may be collected for later processing, or if desired, the camera 20 may include, as also illustrated in FIG. 2, an overhead conveyor 60 for transporting the severed sheets of film in a generally U-shaped path extending from the cutting device 57 and to a subsequent processing station, such as an automatic processor 61. Since the conveyor 60 is disposed in an overhead location, and since the film path through the camera is in a generally upward direction, a minimum amount of space in the dark room 22 is consumed by the process camera 20 and the conveyor 60. Thus, an operator has clear access to the rear of the camera rear case 21 for loading the film rolls 43, 44 and 46 into the camera, for performing other tasks in the dark room, and, more specifically, for operating the camera in the cut sheet mode which requires manual loading of sheets onto the vacuum film holder 55.

Each of the pairs of lower feed rollers 51, 52 or 53 includes a rigid, driven roller 62 disposed in frictional engagement with an elastic mating roller 63, thereby to form a pressure nip as at 64 for receiving the associated film web 47, 48 or 49. Each of the driven rollers 62 is corotatably mounted on a shaft 66, and the mating roller is supported on a parallel shaft 67, mounted so as to permit adjustment of the squeeze or pressure between each driven roller and its mating roller.

It is contemplated by the present invention to provide selectively operable drive means for the driven rollers 62 and to actuate the drive means in response to signals produced by a camera control. Such drive means include a reversible motor 68 having an output sprocket 69 corotatably carried on a motor output shaft 71. The motor output sprocket 69 drives a compound sprocket 72 via a roller chain 73 which is also constrained around an idler sprocket 74. As illustrated in FIGS. 4 and 6, the compound sprocket 72 has an inner sprocket 76 drivingly engaged by the chain 73 and an outer sprocket 77 driving a second roller chain 78. The roller chain 78 passes around an idler sprocket 79 and drives a plurality of sprockets 81, respectively associated through a coaxial clutch 82 with each one of the driven rollers 62, thereby to continuously drive the sprockets whenever the reversible motor 68 is operating.

A selected one of the film webs 47, 48 or 49 is advanced or rewound by its associated pair of lower feed rollers 51, 52 or 53 by actuation of a selected one of the clutches 82 for drivingly connecting the driven sprocket 81 to the driven roller shaft 66, thereby drivingly connecting the selected one of the driven rollers 62 to the motor 68 for driving the roller in a direction dependent upon the direction of rotation of the motor.

In order to thread a selected one of the film webs 47, 48 or 49 into the camera 20, the motor 68 receives an appropriate signal from the camera control via the leads 84 for operating the motor in a direction for outwardly advancing one of the film webs 47, 48 and 49 through selected of the lower feed rollers 51, 52 and 53, and the clutch 82 associated with the lower feed rollers for the selected one of the film webs receives an appropriate signal from the camera control via leads 85a, thereby actuating the clutch to drive the associated driven roller 62 for advancing or rewinding the selected film web.

Also, in accordance with the principles of the present invention, guide means including film gripping means in the form of a vacuum head 86 grasps the selected film web 47, 48 or 49, by vacuum contact with an area near a leading edge of this web, as the same is advanced through the associated pair of lower feed rollers 51, 52 or 53 and guides the leading edge of that film web upwardly through the camera, past the vacuum film holder 55 and into a nip 87 formed between a pair of upper feed rollers 56. The vacuum head 86, as illustrated in FIGS. 4, 5 and 7, includes an elongated hollow member 88 extending transversely across the camera and having a foraminous face plate 89 disposed to confront the lower feed rollers 51, 52 and 53. A flexible hose 91 operatively connects a vacuum source 92 to a hollow interior of the vacuum head 86 for drawing an area near the leading edge of the advanced one of the film webs 47, 48 or 49 into holding engagement with the foraminous face plate 89 for movement with the vacuum head upwardly or downwardly through the camera 20. The vacuum source 92 is selectively connected to the hollow interior of the vacuum head 86 by a solenoid operated valve 93 which receives an appropriate signal from the camera control via leads 94.

The vacuum head 86 is moved vertically of the camera along a plane parallel to a film plane of the camera by a selectively operable drive means including a pair of spaced-apart, looped chains 96 and 97 respectively disposed on opposite sides of the vacuum film holder 55. A lower sprocket shaft 98 extending transversely of the camera below the lowest of the pairs of lower feed rollers 53 and mounted in appropriate bearings 101, 101, has a pair of sprockets 102 and 103 respectively disposed in alignment with another pair of spaced-apart sprockets 104 and 106 mounted above the vacuum film holder 55 and in proximity of the upper feed rollers 56. A shaft 107 extending parallel to the shaft 98 and journaled in appropriate bearings 108,108 supports the upper pair of sprockets 104 and 106. The chains 96 and 97 are respectively looped around the two pairs of aligned sprockets 102, 104 and 103, 106 in a manner to form a chain run extending vertically through the camera and parallel to the film plane thereof as defined essentially by a front, backing surface 109 of he vacuum film holder 55. Opposite end portions of the vacuum head 86 are fixedly attached to the pair of chains 96 and 97 for movement therewith by a pair of chain-attachment brackets 111,111. As illustrated in FIG. 7, the lower shaft 98 corotatably supporting the sprockets 102 and 103 is selectively connected to the reversible motor output shaft 71 via a selectively operable clutch 112, thereby to move the chains 96 and 97 and the vacuum head 86 in a direction dependent upon the direction of operation of the reversible motor 68. The motor 68 and the clutch 112 are provided with leads 84 and 85, respectively, to receive signals from the camera control.

In order to provide a home or reference position for the vacuum head 86, sensor means are positioned at a predetermined location along the vertical path of movement of the vacuum head for producing an appropriate signal whenever the vacuum head passes by the location of the sensor means. The sensor means include a magnet 113 affixed to one of the chain-attachment brackets 111 in a position to operate a reed switch 114 disposed adjacent the vertical chain path. As illustrated in the drawings, the head home or head reference position of the vacuum head 86 may be effectively selected to be above the location where the vacuum head is in a position to pick up or grasp the leading edge of the film web 47 as the same is advanced outwardly by the uppermost pair of lower feed rollers 51 during the threading operation. Starting from this head home or head reference position, the movement of the vacuum head, in response to the camera control, is conveniently monitored by sensor means, to be described, on the lower sprocket shaft 98.

The location of the vacuum head 86 relative to the head home or head reference position, as determined by the location of the reed switch 114, is ascertained by another sensor means driven with the lower sprocket shaft 98 in a manner to produce appropriate signals indicative of increments of angular rotation of this shaft, and thus indicative of the travel of the chains 96 and 97 and therefore of the vacuum head 86. That sensor means include a counting wheel 116 mounted for corotation with the lower sprocket shaft 98 and having a plurality of equally, circumferentially spaced magnets 117 disposed about a periphery thereof. A reed switch 118 positioned adjacent the periphery of the counting wheel 116 is momentarily actuated by each of the magnets 117 as the same are rotated past the reed switch, thereby producing periodic signals corresponding to an angular increment of travel of the lower sprocket shaft 98 and, therefore, of the linear motion of the vacuum head 86.

In accordance with the principles of this invention, the camera control, being programmed for the threading of one of the film webs 47, 48 or 49, is designed to count the number of pulses corresponding to closures of the reed switch 118, and thereby to cause the vacuum head 86 to stop at the appropriate distance from its head home position, to subsequently initiate a threading movement upward as described. As will be explained subsequently, the same counting wheel 116 and associated magnets 117 and reed switch 118 also produce signals corresponding to the movement of masking curtains, to be described.

To provide a feedback signal to the camera control indicating that the vacuum head 86 has reached its topmost position, suitable for transfer of the web to the upper feed rollers 56, a further reed switch 114a is positioned near these feed rollers and is actuated by magnets 113 when the vacuum head reaches such topmost position, thereby causing, via the camera control, the vacuum source 92 to be disconnected from the vacuum head, and the vacuum head to return to its home position.

An indication as to whether one of the film webs 47, 48 or 49 is in driving engagement with the pair of upper feed rollers 56 is given by film sensor means including an ultrasonic sensor 119 disposed immediately below the upper feed rollers 56.

Such ultrasonic sensor is advantageously employed because of its ability to register the presence or absence of material, such as a film web or sheet, via an electrical feedback signal, without making contact with such web or sheet and, moreover, without causing exposure or otherwise adversely affecting the processing cycle, such as may be true for alternative sensing means.

The ultrasonic sensor 119 includes portions disposed on opposite sides of the path of movement of the film webs through the camera and produce a sensing signal whenever film is disposed between the confronting portions. This signal, via a light such as 318 on the camera control panel, assures the cameraman that a web is in a position to be exposed.

The pair of upper feed rollers 56 include a rigid, driven roll 121 and an elastic mating roll 122 disposed in frictional driving engagement with the driven roll in a manner to form a nip for receiving the film web and mounted in suitable bearings allowing adjustment of the pressure or squeeze between these rollers. A separate motor 123 drives a sprocket 127, which in turn, via a chain 126, drives a driven sprocket 124. The sprocket 124 is selectively connected in driving engagement with the driven roller 121 whenever a coaxial clutch 129 receives an appropriate signal from the camera control via leads 131, thereby to drive the driven roller. The operation of the motor 123 is determined by signals transmitted to the motor via leads 132.

In order to provide an indication of the length of the selected one of the film webs 47, 48 or 49 advanced through the nip 87 of the upper feed rollers 56, counting or sensor means including a counting wheel 134 mounted for corotation with the driven roller 121 and a reed switch 136 produce periodic signals indicating angular increments of rotation of the driven roller, and thus indicating the length of film advanced by the upper feed rollers 56. The counting wheel 134 has a plurality of equally, circumferentially spaced magnets 137 disposed around an outer periphery thereof for momentarily actuating the reed switch 136 in a manner to produce a signal transmitted to the camera control.

After a selected one of the film webs 47, 48 or 49 is properly threaded through the camera 20, in response to signals received from the camera control, the vacuum head 86 is returned to its home position and the web is drawn into firm contact with the vacuum film holder 55 by operatively connecting the vacuum film holder to the vacuum source 92. The vacuum film holder 55 includes a hollow, rectangular member 139 having a foraminous wall forming a backing surface 109 for supporting the selected one of the film webs in the film plane of the camera. When the hollow interior of the vacuum film holder 55 is operatively connected to the vacuum source 92 via the flexible hose 141 and the solenoid-actuated valve 142, the film web is drawn into firm engagement with the backing surface 109. The solenoid-actuated valve 142 receives appropriate signals from the camera control via leads 143, thereby selectively connecting or disconnecting the hollow interior to the vacuum source for alternatively grasping the film or releasing the same for further advancement through the camera. While the camera, according to the present invention, is intended primarily for use with film in web form, it may be seen from the description, hereinabove, of the vacuum film holder 55, that this holder can readily be hinged about a vertical edge, in the rear case 21, to allow manual loading and unloading of film in cut sheet form onto the backing surface 109. Except for reference to web movement, the subsequent description also applies to this optical method of operating the camera.

It is contemplated by the present invention to restrict the length of the selected one of the film webs 47, 48 or 49 to be exposed to an equal distance on either side of an optical axis of the camera 20, such equal distance being essentially equal to one-half of such length as selected by the operator via the camera control, as described subsequently. Means for restricting the exposed length of the selected one of the film webs, such as the film web 48, include a pair of opaque masking curtains 146 and 147 which are mounted for movement vertically toward and away from the optical axis of the camera.

Each of the masking curtains is wound on a string-biased roller 148 which is supported in the camera rear case at opposite ends on appropriate brackets 149, as illustrated in FIG. 8 above and below, respectively, of the vacuum film holder 55. A leading edge 151 of each of the masking curtains 146 or 147 is clamped in a guide block 152, which in turn is mounted for sliding movement with a pair of channels 153 formed on opposite sides of the vacuum film holder 55 and disposed within the looped chains 96 and 97.

The spring-biased rollers 148 are biased in a direction to normally wind the masking curtains 146 and 147 onto the rollers, and stop blocks as at 156 supported adjacent the channels 153 prevent the curtains from being completely wound on the rollers and define a maximum open position, or minimum restricted position for the curtains.

In order to move the masking curtains from their fully opened position to a selected position, dogs 157 attached to the looped chains 96 and 97 are moved by the chains into driving engagement with off-set abutments 15 formed on the curtain guide blocks 152.

As illustrated in FIG. 5, a second reference position, termed the curtain home or curtain reference position, is contemplated. This position is selected below the head home position described hereinabove. A reed switch 114b is actuated by magnet 113 on vacuum head bracket 111 to provide a signal to the camera control whenever the vacuum head is in the curtain home position. In this position, as indicated in dotted lines in that Figure, the dogs 157 are moved into driving engagement with the offset abutments 158, thereby enabling movement of the masking curtains from their fully open position.

Since the dogs 152 for the lower masking curtains 147 and for the upper masking curtain 146 are respectively attached to the looped chains 96 and 97 on opposite ones of the parallel, vertical chain runs, as the chain 96 moves in a counterclockwise direction, as viewed in FIG. 5, the dogs will move the upper and the lower masking curtains toward each other by equal amounts and toward the optical axis of the camera 20. In that manner, controlling the amount of movement of the chains 96 and 97 from the curtain home or curtain reference position, wherein the vacuum head 86 is in alignment with the reed switch 114b, the exposed length of the film may be selectively restricted.

It should be noted that the movement of chains 96 and 97 for moving the curtains 146 and 147 takes place during a portion of each cycle of the camera irrespective of whether there is a change in the exposed film length from that of the preceding cycle, that such movement, in any event, is not simultaneous with the movement of chains 96 and 97 required for threading of the film, as described heretofore, and that during such movement the vacuum head 86, while in motion also, is always below the vacuum film holder 55 and thus does not interfere with the exposures of the film. It should further be noted that the masking curtains 146 and 147 are not in the film plane of the camera, and thus, the exposed length of the film web will be somewhat greater than the opening formed between the opposed, free ends 151 of the pair of masking curtains.

In order to control the amount of the movement of the masking curtains 146 and 147, the camera control receives feedback signals from the reed switch 118 for indicating the extend of movement of the curtains from the curtain home or reference position. Those feedback signals are utilized to produce an appropriate signal for controlling the clutch 112 in a manner to actuate the clutch for moving the masking curtains 146 and 147 from the curtain home position and stopping their movement when they have arrived at a selected position, corresponding to an appropriate number of pulses resulting from closures of switch 118, as determined by parameters loaded into the camera control by an operator.

When the film web and the masking curtains have been positioned in accordance with command signals from the camera control, as heretofore described, the system is ready for an exposure. A signal from the camera control signifies this condition to the operator, by illuminating an appropriate exposure push-button to be depressed by the operator, as will be described subsequently. For line exposures, which are those resulting in images without tone graduations, only one exposure, using camera lights 36, is made. Multiple exposures, such as are used for half-tone work, are described subsequently.

After the completion of one exposure, if it is desired to expose another portion of the same film web, such as the film web 48, appropriate signals are transmitted to the solenoid valve 142 for disconnecting the vacuum source 92 from the vacuum film holder 55 to release the film, to the motor 123 for operating the same in the proper direction and to the clutch 129 for drivingly connecting the motor to the driven roller 121. In that manner, the film web 48 may be advanced upwardly through the camera 20. During that advancement of the film web 48, the associated lower feed rollers 52 are not positively driven. The amount of the advancement of the film web 48 is measured by the counting wheel 134 and the reed switch 136, which provide feedback signals for indicating when the proper amount of film has been advanced, thereby producing a signal to disengage the clutch 129 for stopping further advancement. In order to bring a selected length of unexposed film into a proper position for exposure, the film web is advanced past the vacuum film holder 55, normally by an amount substantially equal to one-half of the previous exposed length, plus one-half of the subsequent exposed length. If the camera control, at this time in the cycle, has not received a command, from the cameraman, indicating the exposed length of such subsequent exposure, the second of these advancing motions will not take place until such command, or a command resulting in rewinding of the web, is, in fact, received by the camera control. Once the film web has been advanced by the proper amount, the vacuum film holder 55 is again connected to the vacuum source 92 for holding the film in firm contact with the backing surface 109, and the curtains are appropriately moved in the manner described hereinabove for restricting the exposed length of the film to the selected distance.

In accordance with the principles of the present invention, whenever a leading edge of an exposure which, except for the first exposure, is also the trailing edge of the preceding exposure, on one of the film webs 47, 48 or 49 is disposed within the cutting device 57 at the cutting location further advancement of the film is halted, in response to a signal from the camera control, and the cutting device is actuated to transversely sever the film into a cut sheet, after which the advancement of the film web may be resumed. The cutting device 57 includes a generally horizontally disposed, fixed cutting blade 161 and a generally vertically disposed, movable cutting blade 162 mounted for substantially reciprocal movement upwardly and downwardly past a cutting edge 163 on the fixed cutting blade and spring-biased against this blade. Selectively operable means for moving the blade 162 into cutting relationship to the fixed blade 161 to actuate the cutting device 57 include a sprocket 164 selectively driven by the motor 123 via the chain 126 and a selectively operable clutch 166. The motor 123 and the clutch 166 receive appropriate signals from the camera control via leads 132 and 167 respectively, for drivingly connecting the sprocket 164 to the motor 123 to rotate the sprocket through one revolution. The clutch drives a crank 168, a connecting rod 169 and a bell crank 171.

A magnet M on a second crank C, corotating with crank 168, is disposed to actuate a reed switch 114c.

The feedback signal produced by this reed switch 114c whenever the magnet M is in its vicinity causes the camera control to limit the movement of cranks C and 168, and therefore of the movable knife 162, to one revolution or stroke, respectively. The bell crank 171 and a second bell crank disposed on an opposite side of the movable knife 162 and the movable knife forms a conventional four-bar linkage so that, when the bell crank 161 is actuated, the knife moves through one cycle to transversely sever the film web. The actuation of the cutting device 57 occurs while the upper feed rollers 56 are at rest, thereby enabling the utilization of a single motor for operating both the upper feed rollers and the cutting device.

It is also contemplated by the present invention to limit, below and above, the length of cut film sheets thus severed by the cutting device 57, thereby to permit the use of a variety of conveying means, such as 60, and processors, such as 61, whose capacity for accommodating sheets of various lengths is usually limited. On the other hand, the lower limit of exposed film length desired in practice is often less than the minimum length of such cut sheets that can be accommodated, so that the placement of two or three exposed lengths on a single cut sheet is desirable. To this end, the camera control is designed so that, at such time as the web advance provided by the upper feed rollers 56 and corresponding to an amount equal to one-half of a previous exposed length is completed, as heretofore described, the command signal for the subsequent exposure, provided by the cameraman, in the camera control, is tested by the camera control. If the previous exposed length equals or exceeds a predetermined minimum, such as 10 inches, the signals provided subsequently by the camera control cause this exposed length to be severed by the cutting device 57. If the previous exposed length is less than this minimum, the signals provided by the camera control will automatically prevent the cutting device from severing this length and, instead, will add further such exposed lengths until such minimum is exceeded and can, subsequently, be severed, or, if such length would otherwise exceed a predetermined maximum, such as 24 inches, will cause additional unexposed film web to be advanced so that, at the cutting device 57, the resulting film sheets will be neither less than ten inches nor more than 24 inches in length.

It is also contemplated by the present invention that control of a sheet, cut from the selected one of the film webs threaded through the camera 20, such as the film web 48, be positively transferred to the conveying means 60 and such sheet be transported to the automatic processor 61 for further processing. In that manner, the film is under positive control during the entire operation of the camera.

The conveying means 60 generally include a conveyor input belt section 174 receiving the sheets from the cutting device 57, a chain and gripper section 176 for gripping the individual cut sheets and transporting the same to a delivery belt section 177 extending down a chute 178, as illustrated in FIGS. 1 and 2, for delivering the cut sheets to a pair of feed rollers 179 feeding the cut sheets into the automatic processor 61, the speed of the delivery belt section 177 being manually adjustable to be compatible with, and essentially equal to, that of the infeed rollers 179 of processor 61.

Figure 9:
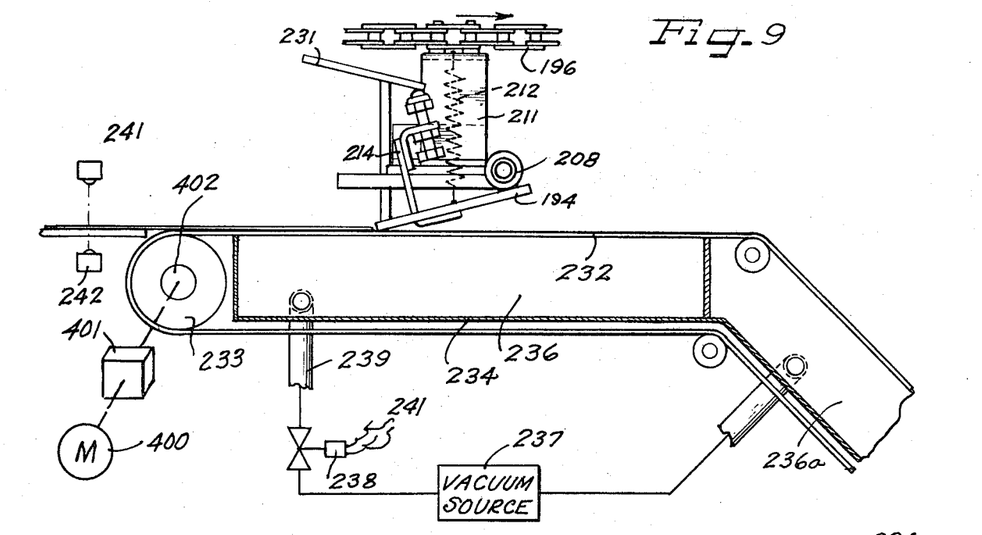
FIG. 9 is an enlarged view illustrating a transfer location between a conveyor chain and gripper mechanism and a delivery belt section of the conveyor for transport of cut sheets to a subsequent processing station.
Figure 10:
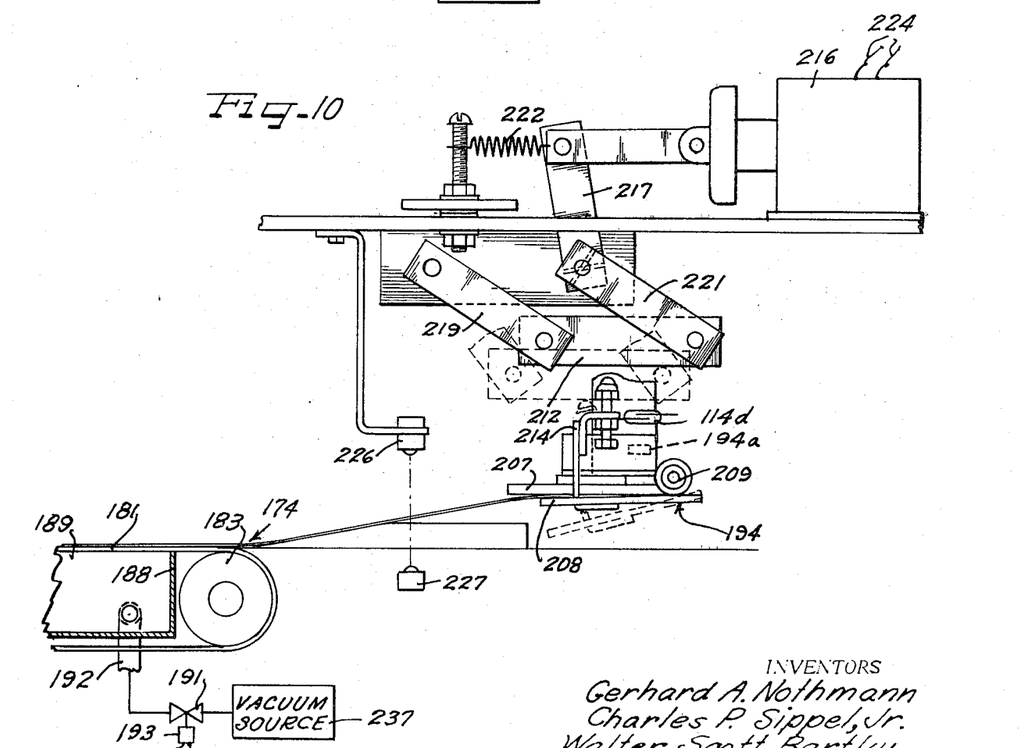
FIG. 10 is an enlarged view illustrating a transfer location between an input belt section for the conveyor and the chain and gripper section of the conveyor.

Referring now to FIGS. 4, 9 and 10, the input belt section 174 includes a foraminous belt 181 constrained around a driven roller 182 and an idler roller 183 in a manner to form a horizontal belt run extending substantially coplanar with the path of movement of the cut sheets from the cutting device 57. The driven roller 182 is operatively connected to a motor 184 via a selectively operable clutch 186 receiving appropriate signals from the camera control via the leads 187, thereby to selectively drive the foraminous belt in a direction for advancing the cut sheets from the camera. In order to provide positive, driving engagement between the cut sheets of film and the moving belt 181, a trough 188 is disposed between the pair of spaced-apart rollers 182 and 183 and has an upper open end closed by the foraminous belt as the same travels through the upper, horizontal path. A hollow interior 189 of the trough 188 is selectively connected to the vacuum source 237 by a solenoid-actuated valve 191 and an appropriate hose 192. By operatively connecting the hollow interior 189 of the trough 188 to the vacuum source 237, the cut sheet of film is drawn onto the foraminous belt 181 for movement therewith. The solenoid actuated valve is controlled by the camera control and receives appropriate signals via the leads 193 for alternatively connecting or disconnecting the trough to the vacuum source.

As illustrated in FIGS. 1 and 2, the chain and gripper section 176 includes a plurality of grippers 194 attached to and equally spaced around a continuous chain 196. The chain 196 is engaged with a plurality of sprockets 197, 198 and guides 199 and 201 for defining a continuous path extending in a generally U-shaped path from the input belt 174 to the delivery belt section 177 and returning in a generally straight path back to the input belt section. A driven sprocket 203 drivingly engages the chain and is driven by a motor 204 and a selectively operable clutch 206 in a manner to move the grippers around the chain path. The clutch 206 is controlled by the camera control, via the leads 206a, to drive the chain 196 intermittently, at a proper time in the cycle and for a distance corresponding to the spacing of the grippers 194.

Between successive movements, the chain 196 is stopped at a position to place one of the grippers 194 in alignment with the conveyor input belt section 174 for receiving the cut sheet advanced by that belt section.

As illustrated in FIGS. 9 and 10, each of the grippers 194 include a fixed, upper plate 207 and a movable lower plate 208 hingedly connected to the upper plate by a hinge 209. An attachment member 211 is affixed to the upper plate 207 and attached to the chain 196 for fixing the grippers 194 to the chain for movement therewith. A spring 212 extends between the attachment member 211 and the movable, lower plate 208 for biasing the movable plate to a closed or gripping position. An adjustable cam follower 213 is attached to the movable plate 208 by an interconnecting bracket 214 so that downward movement of the cam follower moves the movable plate against the bias to the spring 211 to an open position for receiving one of the cut sheets from the input belt 174 or for releasing one of the gripped sheets from the chain and gripper section and depositing the same onto the delivery belt section 177.

A magnet 194a is affixed to each gripper 194 and activates a reed switch 114d disposed so that a signal is fed back to the camera control whenever a gripper 194 arrives in a position appropriate for receiving a film sheet from the conveyor input belt section 174, and thereby to arrest the movement of the chain and gripper section by disengaging clutch 206.

Means for selectively opening one of the grippers 194, when the same is disposed in a position for receiving a cut sheet from the input belt section 174, include a solenoid 216, operating a crank 217 which in turn moves an actuating bar 218 downwardly in a manner to depress the follower 213, thereby opening the gripper 194. A pair of links 219 and 221 are pivotally attached to opposite ends of the actuating bar 218 and cooperate therewith in a manner to form a conventional parallel four-bar linkage for shifting the bar between a disengaged position, wherein the gripper is closed, and an actuated position, as shown by dotted lines in FIG. 10, wherein the gripper is held in an open position. A spring 222 biases the actuating bar 218 to the disengaged position, and the solenoid 216 moves the crank 217 against the bias of the spring to open the gripper 194.

The solenoid 216 is operated in response to receiving an appropriate signal from the camera control via the leads 224 and released in response to receiving another signal for permitting the grippers to close.

It is contemplated by the present invention to provide a signal, from the camera control, whenever the cutting device 57 i actuated, to energize solenoid 216 and to thereby, as described, open the gripper 194 in the sheet receiving position described. It is also contemplated to interlock the gripper system, via the magnet 194a and the reed switch 114d, with the camera control so that the cutting device 57 can only be actuated when a gripper 194 is in such position. It is further contemplated to provide sensor means for producing a signal to indicate that a leading edge of a cut sheet is approaching the gripper 194. That sensor means includes an ultrasonic sensor having portions 226 and 227 disposed in a vertically, spaced-apart relationship at a point immediately upstream of one of the grippers 194 when the same is disposed in a position to receive the cut sheet. The signal produced by the ultrasonic sensor means is transmitted to the camera control and, after a predetermined delay to permit the cut sheet to be advanced into the open gripper, a signal is transmitted to the solenoid 216 for releasing the same, thereby permitting the gripper to close and grasp the cut sheet. Substantially simultaneously with the deactuation of the solenoid 216, the solenoid actuated valve 191 receives a signal to disconnect the vacuum source 237 from the hollow interior 189 of the trough 188, thereby to release the cut sheet from the input belt section 174. Once the cut sheet has been grasped by the gripper 194, the clutch 206 is energized in response to a signal from the camera control to advance the conveyor chain 196 through a motion so as to place the next gripper 194 into a position for receiving the next cut sheet. During this motion, the gripper holding the cut sheet moves it to an intermediate position between the input belt section 174 and the delivery belt section 177.

During the next movement of the conveyor chain 196, the gripper holding the cut sheet is transported past a drop off station over the delivery belt section 177. As illustrated in FIG. 9, after the cut sheet is brought into alignment with the delivery belt section 177, the gripper 194 moves under an inclined plate 231, which forms a cam for operatively engaging the cam follower 213 in a manner to move the lower plate 208 against the bias of the spring 212 to open the gripper, thereby releasing the cut sheet into the delivery belt. The delivery belt section 171 is constructed similarly to the input belt section 174 and includes a foraminous belt 232 constrained around pulleys as at 233 in the manner to form a horizontal belt run closing an open end of trough 234 having a hollow interior 236, which may be selectively connected to the vacuum source 237 via solenoid operated valve 238 and an appropriate hose 239. The solenoid actuated valve 238 is controlled by the camera control and receives appropriate signals via the leads 241 for operatively connecting the vacuum source 237 to the hollow interior 236 or disconnecting the vacuum source therefrom.

The downstream portion of the delivery belt section 177, disposed substantially within the delivery chute 178, includes a further hollow interior 236a, continuously connected to the vacuum source 237, thereby assuring positive guided movement of successive film sheets downwardly on the chute 178 and into the processor 61.

As a cut sheet approaches the delivery belt, the vacuum source 237 is not connected to the hollow trough interior 236, thereby permitting the cut sheet to move relative to the foraminous belt 232 for bringing the cut sheet into alignment with the belt travel as the chain 196 travels around an arcuate path tangent to its subsequent path parallel to the movement of the belt. When the cut sheet is in alignment with the belt, sensor means, including an ultrasonic sensor having vertically spaced apart, aligned portions 241 and 242, are operated to produce a signal which is received by the camera control. In response to that signal, the solenoid valve 238 is actuated to evacuate the trough interior 236 for drawing the cut sheet into driving engagement with the foraminous belt 232 after it has been released by the gripper 194 via cam 231. The belt is driven at a speed compatible with the speed of operation of the automatic processor 61 which is also the speed of the processor infeed rollers 179 so that, when the sheets are gripped in the nip of the infeed rollers, they will neither buckle or be damaged. In the exemplary form of the invention as herein disclosed, the drive includes continuously rotatable motor 400 and a manually adjustable variable speed drive 401 operatively connected to the shaft 402 carrying the pulleys 233.

In order to control the sequence of successive sheets so they will neither overlap on the delivery belt nor be spaced apart excessively to cause undue delays in the camera production cycle, the ultrasonic sensor portions 241 and 242 sense a trailing edge of the cut sheet on the belt 232, thereby providing a signal which may be utilized by the camera control for preventing further transfer of cut sheets onto the delivery belt 177, by preventing movement of chain 196, until the trailing edge of a previously deposited sheet clears the sensor and, subsequently when the trailing edge has cleared the sensor, to enable the camera control to cause further sheets to be moved in the conveyor.

The camera 20 also includes appropriate means as at 251 for moving in response to a signal received from the camera control, a selected one of a pair of half-tone screens such as 252 into position over one of the film webs 47, 48 or 49 held on the vacuum film holder 55, as illustrated in FIG. 2. Exposure cycles using such half-tone screens 252 generally consist of three exposures on the same exposed film length, termed Bump, Main and Flash. For such exposures, in accordance with the present invention, the Bump exposure, which uses the camera lights 36 illuminating the copyboard is made, in response to a signal provided by the camera control, before the screen 252 is moved into position. After such Bump exposure, in response to the exposure completion signal produced by the Bump timer to be described, in the camera control, the appropriate screen moves into position, as described heretofore, and is brought into intimate contact with the film web and the vacuum film holder 55 via the vacuum source 92. After an appropriate preselected time delay to assure good contact between the screen, web and holder, the Main and Flash exposures are initiated, simultaneously, by the camera control. The Main exposure utilizes camera lights 36, illuminating the copyboard while the Flash exposure utilizes a flat luminescent panel light source 37 disposed around the lens and shutter in a manner so as to provide direct illumination of the exposed film length through the half-tone screen, but not interferring with the Main exposure light rays. In this manner, the Main and Flash exposures proceed simultaneously until the shorter exposure, as determined by the appropriate timer, to be described, is ended, the other one continuing in accordance with the appropriate other timer. When both Main and Flash exposures are completed, the camera control causes the vacuum source 92 to be disconnected from the vacuum film holder 55 and the screen 252 to be moved away from the film web and into its non-operative location such as at 251. Further, in response to signals from the camera control, the film web is caused to advance and the other movements required for the subsequent exposure cycles are caused to take place, as described heretofore.

When it is desired to change from one of the film webs 47, 48 or 49 to another one of the film webs, it is necessary to rewind the film web, such as the web 48, which is threaded into the camera 20. Before the film web 48 may be rewound, the camera control will cause that film web to be advanced by operating the upper feed rollers 56 sequentially until all previously exposed lengths of the web have been severed by proper actuation of the cutting device 57. At that point in the cycle, appropriate signals are transmitted to the reversible motor 68 and the clutch 112 in a manner to raise the vacuum head 86 into a position beneath the upper feed rollers 56 for grasping the film web as the same leaves the upper feed rollers. Once the vacuum head has been raised to the proper position, the motor 68 is reversed and the clutch 82 associated with the proper one of the pair of lower feed rollers, such as the lower feed rollers 52 for the film web 48, is actuated for rewinding the film web onto the roll 44. When the appropriate length of the film web 48, as measured by the counting wheel 134 and the reed switch 136, has been rewound so that the film web is almost clear of the upper feed rollers 56, appropriate signals are transmitted from the camera control to momentarily discontinue further rewinding and to operate the solenoid actuated valve 93 for connecting the vacuum source 92 to the vacuum head, thereby grasping the film web for controlled movement downwardly through the camera 20. With the film web 48 properly grasped by the vacuum head 86, the clutch 112 as well as the clutch 82 for the lower feed rollers 52 are actuated to rewind the film.

In order to maintain the film webs 47, 48 and 49 in a taut condition on their associated rolls 43, 44 and 46, it is contemplated by the present invention to provide frictional drive means operating only during the rewinding process in a manner to rotate the rolls in a direction to wind the film web thereon. As illustrated in FIGS. 4 and 6, each of the mandrels 40, 41 and 42 has a separate frictional drive means, and each such drive means includes a flexible belt 261 constrained around spaced-apart pulleys 262 and 263 and engaging a friction wheel 264 so as to provide light driving contact permitting slippage as described subsequently. The friction wheels 264 are mounted on the mandrels 40, 41 and 42 for corotation therewith. Each of the pulleys 263 has a gear 266 connected thereto via a unidirectional clutch 267 for drivingly connecting the gear to the pulley for rotation only in a direction to rewind the film webs 47, 48 and 49 onto their associated rolls 43, 44 and 46. The gear 266 is driven via an intermeshed gear 268 carried on the shaft 66 for corotation therewith. The components of the friction drive are selected so that the flexible belt 261 tends to drive the friction wheel 264, and thus the associated mandrels 40, 41 and 42 at a speed somewhat faster than would correspond to a speed necessary to rewind the film webs 47, 48 and 49 onto their associated rolls when the rolls are in an empty or almost empty condition. Thus, when the film rolls 43, 44 and 46 are full, there is considerable slippage between the belt 261 and the friction wheel 264, with that slippage decreasing as the film rolls empty. The contact between belt 261 and friction wheel 264 is adjustable so that the film will always be driven with sufficient torque to avoid spillage of the film web but with light enough contact to prevent belt wear or undue resistance during web advance.

Figure 11:
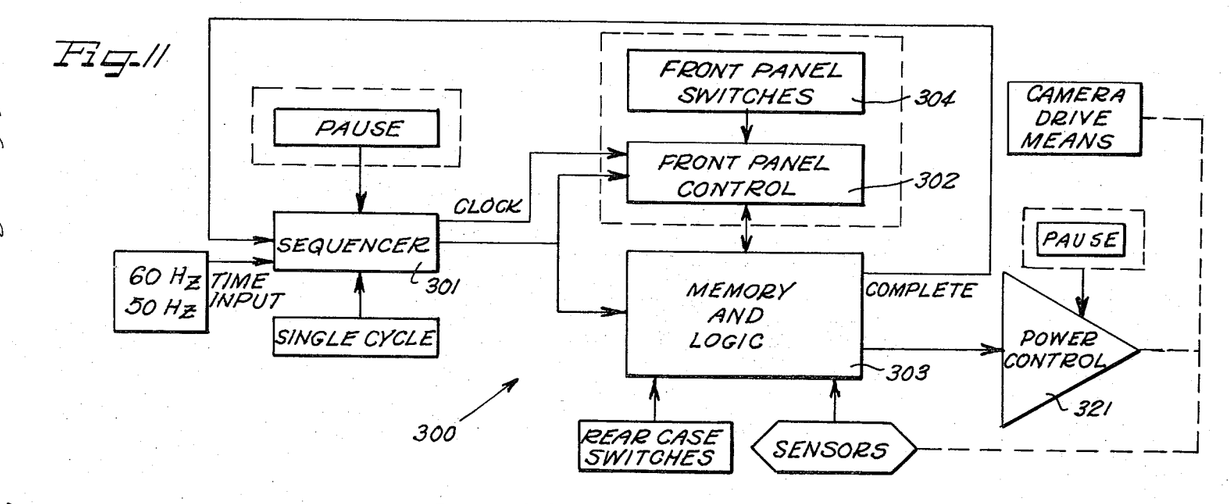
FIG. 11 is a schematic, block diagram illustrating the operation of a control for the camera of the present invention.

Further, in accordance with the present invention, the various selectively operable clutches, motors and solenoid-actuated valves for operating the components of the camera 20 are automatically controlled by a computer-like camera control, generally indicated at 300 and as illustrated schematically in FIG. 11. The automatic camera control 300 generally includes three major components, namely a sequencer 301, a front panel control 302 and a memory and logic 303. These components and associated other units illustrated are selected to provide flexibility in adaptation of this camera control not only in its application to the camera and conveyor here described but also to other configurations based on the principles of the present invention. A cameraman or operator selects the variable parameters for each individual camera cycle such as the proper one of the film webs 47, 48 or 49, the exposed length of the film, one of the two half-tone or contact screens such as 252, or no screen, and the type and duration of the exposure. The control 300 is programmed by making settings on the front panel control by the actuation of appropriate front panel switches, as indicated at 304.

The front panel control, including the front panel switches, is the main input for the control system 300 and is desirably located in the gallery 24 so that the operator may control all of the camera operations without leaving the gallery.

Figure 3:
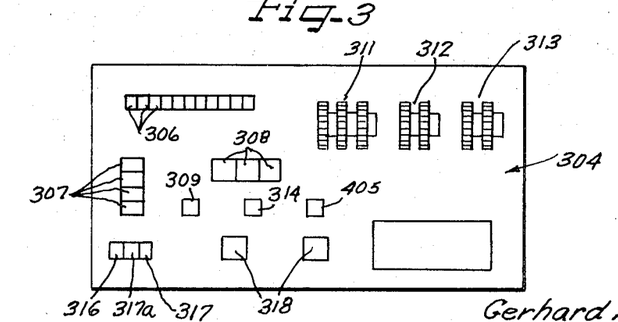
FIG. 3 is a front elevational view of a camera control panel utilized by an operator for loading various, selected parameters into a camera control.

As illustrated in FIG. 3, the front panel switches may include a plurality of push button selector switches as at 306 utilized to program the selected exposed length and a group of switches as at 307 for programming a selected one of the three differently sized film webs 47, 48 or 49, or no film web so that the camera may be utilized with cut sheets. Also, three selector switches 308 permit programming one of the two contact screens such as 252 or no screen. After the operator has actuated the selected ones of the switches 306, 307 and 308, that portion of the program is loaded into the computer by actuating an input switch 309.

Three sets of thumb wheel digital timer switches 311, 312 and 313 respectively permit selection of the duration of a main (line), bump and/or flash exposure. After the threading and/or advancement of the film web and positioning of the masking curtains has been completed, an indication is given automatically, via illumination of the push button 314, that the camera is ready for an exposure at which time the push button 314 may be actuated to initiate the exposure cycle. In turn, after such exposure has been initiated, an indication is given automatically, via illumination of the input switch 309, that a further group of parameters, for a subsequent exposure, may be loaded into the computer. A power switch 316 and a power off switch 317 control the supply of power to the camera components, and a pause switch 317a permits momentary interruption of the camera cycle when desired. A push button switch 405 is also provided, allowing the cameraman to cancel an exposure already in progress and, when this interruption has occurred, to immediately proceed to the next camera cycle. Also, if desired, various indicating lights as at 318 may be provided to indicate the condition of the camera as the same progresses through the cycle.

Referring now to FIG. 11, the variable parameters selected by the operator's actuation of the various switches on the front panel control appear as binary signals in the memory and logic unit 303 which then controls operation of the camera. The memory and logic unit 303 also receives the signals produced by the various sensor means and counting means described hereinabove and utilizes those signals, along with the instructions received from the front panel control to produce appropriate signals which are amplified by a power control 321 and transmitted to the various, selectively operable camera drive means for controlling the operation of the camera. At the completion of a given operation, the memory and logic unit 303 produces a complete signal directed to the sequencer 301 which gives an instruction for the memory and logic unit 303 to advance to the next sequential operation.

Figure 12:
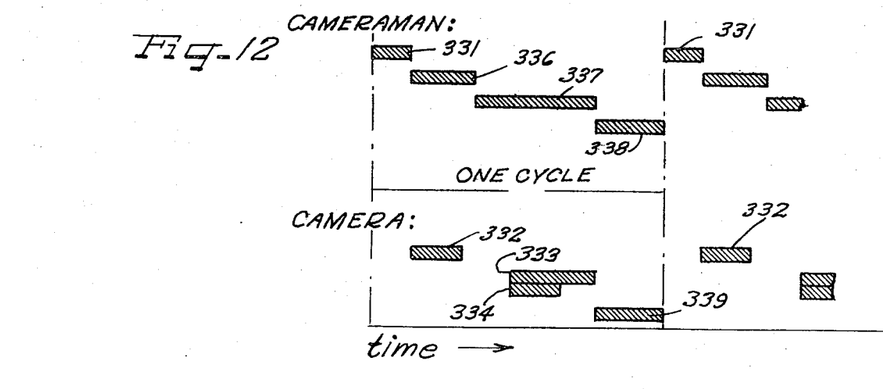
FIG. 12 is a graph illustrating the sequence of operations of the camera of the present invention and of a cameraman or operator with the abscissa representing a time scale.

With the camera 20 of the present invention, the time and skill of a cameraman is utilized to a maximum, as graphically illustrated in FIG. 12. With one of the film webs 47, 48 or 49 properly threaded into the camera 20, one cycle of the camera may be considered to commence with initiation of the exposure, as graphically indicated by the bar 331. After initiation of the exposure, the camera automatically exposes the film in the selected manner, as determined by the prior setting of the digital thumb wheel timer switches 311, 312 and 313. The bump, main and/or flash exposures consume the times indicated graphically by the bars 332, 333 and 334, respectively. During these exposures, the cameraman may actuate the front panel switches for programming the next exposure, as indicated by the bar 336, and he may also evaluate a piece of copy for a subsequent exposure or evaluate negatives produced by the processor 61, as indicated by the bar 337. At the end of the exposures, the cameraman may change the copy in the copyboard mechanism 31, as graphically indicated at 338, while the camera advances the film web, severs the film and positions the masking curtains to prepare the camera for the next exposure, as graphically indicated by the bar 339. Once the camera has advanced to position the film for the next exposure, another cycle may be initiated by the cameraman.

Although those versed in the art might suggest various minor modifications, it should be understood that we wish to embody within the scope of the patent warranted hereon all such modifications as reasonably and properly come within the scope of our contribution to the art.

We claim as our invention:

1. A processing camera for exposing and processing film material in web form,
   backing means providing a stationary backing surface for the film in the focal plane of the camera,
   a plurality of mandrels supported on one side of said backing means,
   each forming an individual unwinding mandrel for a roll of film,
   a pair of feed rollers in association with each mandrel, each having a pressure nip engaging and paying off a roll of film from the mandrel,
   means selectively operable to drive at least one feed roller of a selected pair of feed rollers,
   a pair of film advancing rollers disposed on the opposite side of said backing means from said feed rollers and having a pressure nip for engaging a selected film web and advancing the web along said backing means,
   means selectively operable to drive at least one of said advancing rollers,
   gripping means movable between said feed rollers and said film advancing rollers, grasping a leading end portion of the film as advanced by said feed rollers and carrying the film along said backing surface and inserting the leading end of the film into the pressure nip between said film advancing rollers.

2. The processing camera of claim 1, including
   sensing means adjacent said film advancing rollers, sensing insertion of the web in the nip between said film advancing rollers.

3. The processing camera of claim 2
   wherein the sensing means is an ultrasonic sensing means, and wherein other sensing means sense the position of said film gripping means adjacent said film advancing means and effect reversal thereof to said feed rollers.

4. The processing camera of claim 1, wherein the film gripping means comprises a vacuum head grasping a leading end portion of a selected film web adjacent said feed rollers by vacuum and retaining the film web to said backing surface and positioning the film web into the nip between said film advancing rollers.

5. The processing camera of claim 4, including at least one endless flexible drive member forming a support for said film gripping means and reciprocably moving said film gripping means between said feed rollers and said film advancing rollers,
a source of vacuum and means connecting said film gripping means with said source of vacuum to retain the film thereto upon movement of the film to said advancing rollers.

6. The processing camera of claim 5, wherein the drive means for the feed rollers includes,
a first motor
means driven by said first motor for driving selected of said feed rollers,
wherein the drive means for the advancing rollers includes a second motor,
means driven by said second motor for driving said film advancing rollers,
said first motor being a reversible motor, and a selective drive connection from said first motor to said flexible drive member for effecting travel of said film gripping means toward and from said film advancing rollers,
and means sensing travel of said film gripping means, and operable to reverse travel of said film gripping means as the film is inserted in the nip between said film advancing rollers.

7. The processing camera of claim 1, including a pair of opaque curtains respectively mounted on opposite sides of the optical axis of the camera for movement along a plane parallel to said backing surface toward and from the optical axis of the camera, for restricting the length of film to be exposed to a preselected length,
an endless flexible drive member forming a support for said film gripping member and having parallel runs movable in planes parallel to the plane of said backing surface,
and means spaced along the outgoing and incoming runs of said flexible drive member, having drive connection with said curtains to move said curtains toward each other upon movement of said gripping member towards said film advancing rollers.

8. The processing camera of claim 7, wherein the drive connection to said flexible drive member includes a clutch, and
wherein means are provided to disengage said clutch and stop movement of said curtains when at a preselected position.

9. The processing camera of claim 8, wherein spring means are provided to retractably move said curtains relative to each other, and wherein the means moving said curtains towards each other comprises dogs extending inwardly of the outgoing and incoming runs of said endless chains, and guide blocks on said curtains engaged by respective ones of said dogs for moving said curtains toward each other and accommodating retractable movement of said curtains with respect to each other.

10. The processing camera of claim 2, including a cut-off knife in the path of movement of the film web on the outgoing side of said film advancing rollers for transversely severing the film to form individual cut sheets,
selectively operable actuating means for operating said cut-off knife to sever the film, and control means for said cut-off knife stopping travel of said film advancing rollers as the film is advanced to a selected location, to sever a preselected length of film.

11. The processing camera of claim 10, including conveying means at the outgoing side of said cut-off knife for transporting the severed length of film for further processing.

12. The processing camera of claim 10, wherein the conveying means includes an endless conveyor belt disposed above and traveling in a plane parallel to the plane of travel of the severed film sheets,
a motor,
drive connection from said motor for selectively driving said belt,
a plurality of grippers spaced along said belt, means suspending said grippers from said belt, each gripper including a pair of hinged gripper plates biased into gripping engagement, and
cam and follower means opening said gripper plates to receive and release a film sheet at the receiving and discharge ends of said conveyor.

13. The processing camera of claim 12, wherein control means is provided for stopping the belt with said gripper plates in position to receive a sheet of film, and
wherein a belt conveyor is provided between said cut-off knife and said gripper plates for supplying a severed film sheet to said gripper plates.

14. In a processing camera for exposing and processing film material in web form,
an exposure station,
film feeding means feeding a length of film for exposure,
film advancing means at the opposite side of said exposure station from said film feeding means for advancing the exposed film for cut-off,
a film gripping member movable between said first and second mentioned means and extending transversely across the film web,
means effecting gripping of the film by said film gripping member for carrying the free end of the film from said feeding means to said advancing means,
means moving said film gripping member between said feeding means and said advancing means including a pair of spaced endless chains on opposite sides of the exposure station and guided for movement in planes parallel to the plane of said exposure station, brackets for attaching said gripping member to said chains to be moved thereby, means selectively operable to drive said chains in reverse directions, other means controlling the areas of the film web to be exposed including a pair of spring biased opaque roll curtains supported on opposite sides of said exposure station and biased into retracted positions, track means extending parallel to said exposure station, guide blocks on the free ends of said curtains, slidably guided in said track means to move in planes parallel to the plane of the exposure station, abutment members extending into the space between the outgoing and incoming runs of said endless chains, dogs on the outgoing and incoming runs of said endless chains and extending inwardly therefrom for engagement with associated of said abutment members to extend and move said curtains toward each other to restrict the light from outside of the area defined by said curtains, said brackets and dogs being attached to said chains, and said chains, brackets, dogs, and guide blocks being disposed outside of the exposed area of the web, and the spacing between said dogs and said guide blocks being such as to accommodate continued movement of said film gripping member toward said film advancing station after the exposure of the film, and to accommodate retractable movement of said curtains and reverse travel of said gripping member to return said gripping member to a position adjacent said feed means.

15. The processing camera of claim 14, wherein the gripping member includes a hollow member extending transversely of the web and having a foraminous wall confronting the web, means connecting said foraminous member with a source of vacuum, and sensing means adjacent said film advancing means sensing the insertion of the film web in said film advancing means.

16. The processing camera of claim 12, including a cut-off knife disposed downstream of said film advancing means, sensing means controlling movement of the web to said cutting means to first stop when successive selected exposed lengths of said web are disposed at said exposure station and, secondly, when the leading and trailing edges of the exposed lengths are disposed at said web cut-off knife.

17. The processing camera of claim 13, wherein the means controlling movement of the web includes monitoring means determining the length of sheets severed by said knife, between minimum and maximum lengths of sheet and controlling operation of said advancing means and said knife.

* * * * *